Patented Apr. 14, 1936

2,037,585

UNITED STATES PATENT OFFICE 2,037,585

METHOD OF MAKING PHENOLIC RESINS

Frederick M. Murdock, Chicopee Falls, Mass., assignor to The Fiberloid Corporation, Indian Orchard, Mass., a corporation of Massachusetts No Drawing. Application July 31, 1934,
Serial No. 737,764

5 Claims. (Cl. 260—4)

The present invention relates to the manufacture of phenolic resins or condensation products made by the reaction of a phenolic body and an aldehyde, and particularly to certain improvements in the production of transparent, translucent or opaque white resins, and in preventing discoloration due at least in part or in some circumstances to the oxidation of the alkaline phenolic aldehyde mixture or during the alkaline reaction. The present invention is based in part on the discovery that certain salts and particularly alkaline carbonates can be employed as catalysts for the reaction, and that when so employed even more satisfactory results are obtained if to the reaction mixture is added initially a small amount of certain acids, for instance, lactic, malic or glycolic acid. The neutralization of part of the alkaline carbonate by the acid produces carbon dioxide ($CO_2$) and the gas thus generated tends to free the reaction materials from dissolved or included air. I find that the reaction proceeds more satisfactorily in the presence of the alkaline carbonate than in the presence of either an alkali or an acid.

I have employed herein the term "initial reaction" to designate that part of the procedure of producing phenolic resins which takes place while the phenolic body and the aldehyde are reacting in the presence of the catalyst and before any steps are taken to remove the volatile products of the reaction.

One preferred form of practicing the invention will now be described. A mixture is formed of about 100 parts of phenol and between approximately 85 to 425 parts of formaldehyde, the molecular proportion of these mixtures ranging from 1 to 5 molecules of formaldehyde to one of phenol. The proportion of the formaldehyde is based on the use of the 37% solution. For the production of a water white or substantially water white resin, it is essential that pure or substantially pure materials be employed. The mixture is placed in a suitable vacuum kettle and from 1 to 5 parts of alkaline carbonate is added. If sodium carbonate is employed, 4.4 parts is a convenient amount. To the mixture is also added sufficient lactic acid to neutralize about $\frac{1}{10}$ of the alkaline carbonate employed. When 4.4 parts of sodium carbonate are used, 1 part of 85% lactic acid is sufficient. The amount of lactic acid to be added should be sufficient to neutralize only about one tenth of the alkaline carbonate employed, it being essential to leave sufficient unneutralized carbonate to promote the reaction. The air is then exhausted from the kettle and as high a vacuum as conveniently possible is produced. The vacuum pump is then shut off but the air is not readmitted. Heat being applied and the temperature of the reaction mixture having risen a few degrees, the reaction chamber is again exhausted to remove further traces of air and the vacuum line is shut off again. If necessary this operation may be repeated. The heating of the reaction mixture is continued while the air is still excluded and the vacuum line is shut off.

The reaction between the lactic acid and the sodium carbonate produces carbon dioxide ($CO_2$) most of which is retained in the vacuum chamber.

The temperature at which the reaction is carried out may be varied within wide limits. It has been found desirable, however, to conduct the reaction between 70° and 120° C., but it is possible to carry out the reaction at temperatures outside this range. If the reaction is carried out at temperatures in the upper part of the temperature range given, the pressures in the chamber due to the presence of vapors from the reaction mixture may be greater than atmospheric. The duration of the reaction depends, of course, upon several factors, one of which is the reaction temperature. In practice it has been found that the various factors may be regulated so that the duration of the reaction need not exceed four hours, once the mixture has reached the reaction temperature. After the initial reaction has been completed, additional lactic acid is added, namely, from 1 to 10 parts and if desired a softener, for instance, 5 to 35 parts of glycerine. Preferably the lactic acid and the softener used are introduced by pulling them into the mixture by means of a vacuum device associated with the reaction kettle. In this way the entrance of air is prevented.

Thereafter the reaction is continued and the volatile constituents of the mixture may be removed in the ordinary way, that is by heating while a vacuum is maintained. The final mixture can be cast, cured, or otherwise treated in accordance with the well understood procedure.

A particular formula which can be employed in practicing my invention is as follows:

Phenol 100 parts; formaldehyde (37%) 258 parts; sodium carbonate 4.4 parts; and lactic acid (85%) 1 part. The initial reaction is carried on for about two hours at temperatures between 70 and 80° C. Thereafter, the mixture is neutralized with 8.5 parts of lactic acid and such softeners as required are added. Thereafter the reaction is continued until volatile constituents of the mixture are removed in the ordinary way, that is, by heating while a vacuum is maintained.

No claim is made in the present application for exclusion of air by means of a vacuum during the initial reaction as these features are the discoveries of another inventor and are claimed in other applications.

The preceding formula for practicing my new process gives a wide range of ingredients and many practical resins may be produced by varying the ingredients and their proportions within the limits mentioned. One particularly satisfactory resin may be produced by employing 100 parts by weight of phenol to 258 of formaldehyde (the molecular proportions being about 3 molecules of formaldehyde to 1 of phenol), 4.4 parts sodium carbonate and 1 part of 85% lactic acid in the initial reaction and subsequently adding 8.5 parts of lactic acid and a suitable softener.

I claim:

1. The method of making phenol aldehyde resins of the character described which consists in carrying on the reaction in the absence of air or other oxidizing agents and in the presence of carbon dioxide generated by ingredients contained in the reaction mixture.

2. The method of making phenol aldehyde resins of the character described which consists in reacting the phenol and the aldehyde in the absence of air or other oxidizing agents and in the presence initially of an acid and a carbonate and thereby generating an inert gas during the reaction.

3. The process of making phenol aldehyde resins of the character described which consists in reacting 100 parts of phenol with from 85 to 425 parts by weight of a 37% solution of formaldehyde in the absence of air or other oxidizing agents and in the presence of from 1 to 6 parts of an alkaline carbonate, and lactic acid sufficient to neutralize about one tenth of the carbonate.

4. The process of making phenol aldehyde resins of the character described which consists in reacting 100 parts of phenol with 258 parts by weight of a 37% solution of formaldehyde in the absence of air or other oxidizing agents and in the presence of 4.4 parts of sodium carbonate and 1 part of lactic acid.

5. The process of making phenol aldehyde resins of the character described which consists in reacting 1 part of phenol with 258 parts by weight of 37% solution of formaldehyde in the absence of air or other oxidizing agents and in the presence of 4.4 parts of sodium carbonate and 1 part of lactic acid, heating the mixture at between 70 and 80° C. for about two hours, neutralizing the mixture with about 8.5 parts of lactic acid and thereafter removing the volatile constituents.

FREDERICK M. MURDOCK.